United States Patent [19]

Bullen, Jr.

[11] 4,171,587

[45] Oct. 23, 1979

[54] DEVICE FOR DISENGAGING SNAGGED FISH HOOKS AND LURES

[76] Inventor: George S. Bullen, Jr., 1325 Macbeth St., McLean, Va. 22101

[21] Appl. No.: 897,264

[22] Filed: Apr. 18, 1978

[51] Int. Cl.² ............................................. A01K 97/00
[52] U.S. Cl. ..................................................... 43/17.2
[58] Field of Search ....................... 43/17.2, 5; 24/235

[56] References Cited

U.S. PATENT DOCUMENTS

| | | | |
|---|---|---|---|
| 1,726,446 | 8/1929 | McKinney | 43/17.2 |
| 1,851,370 | 3/1932 | Munger | 43/17.2 |
| 2,768,462 | 10/1956 | Younce | 43/17.2 |
| 2,950,558 | 8/1960 | Karpes | 43/17.2 |
| 3,039,223 | 6/1962 | Pavek | 43/17.2 |
| 3,061,967 | 11/1962 | Hill | 43/17.2 |
| 3,831,229 | 8/1974 | Craven | 24/235 |

*Primary Examiner*—Nicholas P. Godici
*Attorney, Agent, or Firm*—Frederick L. Bergert

[57] ABSTRACT

A device for disengaging snagged fishing hooks and lures is disclosed. The device includes a pole member and an operative end member which is bifurcated to define a central opening for retaining the fishing line during operation of the device. The end member is provided with features which include a flat end portion, a downwardly extending hook on one side thereof and a small opening located immediately below the hook to allow the fishing line to enter the central opening. The interior sides of the central opening are straight and smooth to avoid snagging the fishing line. The general construction of the present invention results in a straight or direct line of force from the operator through to the end of the device, thus facilitating the disengagement of snagged hooks and lures.

5 Claims, 6 Drawing Figures

DEVICE FOR DISENGAGING SNAGGED FISH HOOKS AND LURES

BACKGROUND AND SUMMARY OF THE INVENTION

The present invention relates to a device for disengaging snagged fishing hooks and lures. More particularly, the present invention relates to a device which may be fastened to a pole and employed for the disengagement and retrieval of snagged fishing hooks and lures located under the surface of the water.

Previous devices for the disengagement and retrieval of snagged fishing hooks and lures from beneath the surface of the water have included devices such as those described in U.S. Pat. Nos. 1,851,370 and 2,768,462. The device disclosed in U.S. Pat. No. 1,851,370 includes a releasing device wherein a pole is provided with a yoke-like member attached thereto, the yoke having an opening cut out of its body portion and connected with the yoke by a contracted throat. The device of U.S. Pat. No. 2,768,462 includes a pole having an end member attached thereto which includes a pair of arms folded over each other at the end portion thereof to provide a gap in the end and with an opening within the space surrounded by the arms. Other prior art devices for disengaging snagged fish hooks and lures have included devices which have relied upon gravity and the weight of retrieving device to disengage the snagged hooks.

By the present invention, there is provided an improved device for the disengagement or release of snagged fishing hooks and lures. The device of the present invention includes a hook configuration which facilitates the initial engagement of the device with the fishing line, snagging the line and guiding it into a central opening of the device. The construction and configuration of the present invention effectively prevents disengagement of the fishing line from the device, once the line has passed into the central opening. The particular construction of the present invention provides a rigid connection, with the line of force extending directly from the arm of the fisherman through the pole to the operative end of the device, thus allowing the full effect of the force exerted by the fisherman to be directed in a straight line, without any off-set components which would result in a torque or bending action. In addition, the present invention is provided with a streamlined design which allows the device to be guided down the fishing line to the snagged hook through even the thickest brush or grass without the device becoming entangled in such obstacles.

BRIEF DESCRIPTION OF THE DRAWINGS

The advantages and features of the device of the present invention will be more fully understood from the following description of the preferred embodiments, taken in conjunction with the accompanying drawings, wherein.

DESCRIPTION OF THE PREFERRED EMBODIMENTS

Figure 1:
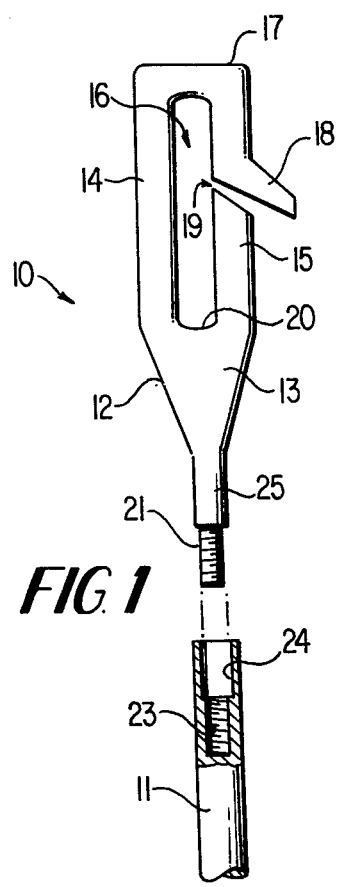
FIG. 1 is a perspective view of the device of the present invention.
Figure 2:
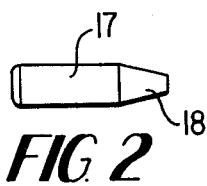
FIG. 2 is a plan view of the device of FIG. 1.

In the illustrated embodiment of the present invention as shown in FIGS. 1 and 2, there is provided a device 10 for disengagement of fish hooks and lures, including a pole member 11 and an operative end member 12 for attachment to said pole member 11. The end member 12 includes a throat portion 13 at the lower end thereof, said throat portion 13 branching into a pair of upwardly extending bifurcations 14, 15 which lie in a common plane with the throat portion 13 and which together define a central opening 16 therebetween. The end member 12 may be constructed of any suitable durable, light weight material such as, for example, aluminum alloy material. One of the bifurcations 14 extends upwardly, across the top and approximately half way down the opposite side of the opening 16, thus describing an inverted U-shaped configuration, while the other bifurcation 15 extends approximately half way up the opposite side of the opening 16 to a point just short of engagement with the end of bifurcation 14.

That portion 17 of bifurcation 14 which defines the upper end of the end member 12 has a flat outer surface, a feature which has been found to be advantageous in disengaging snagged fishing hooks and lures. The remaining portions of bifurcations 14 and 15 are generally circular in cross-section so that smooth, rounded surfaces are present on the interior of the device adjacent the opening 16. The interior surface 20 at the upper end of the throat 13 is also smooth and rounded. Such smooth and rounded interior surfaces prevent fishing line from being caught and held on the interior of the device and also reduce line wear. The straight side walls defined by the bifurcation 14, 15 also assist in allowing for smooth flow of line when pushing the device 10 down the line.

The bifurcation 14 terminates in a hook member 18 which extends outwardly and downwardly at an angle of approximately 22 to 68 degrees, relative to the longitudinal axis of the device 10. A device 10 with a hook 18 angle of about 56 degrees has been employed with good results. The hook 18 should extend outwardly beyond the main portion of the bifurcation 14 a distance of from about ⅛ inch to about 7/16 inch. A length of less than about ⅛ inch will make it difficult to snag the fishing line, while a length of more than about 7/16 inch will result in the hook 18 becoming snagged on debris and the like, rather than having the streamlined configuration which is desired. A hook 18 length of about ¼ inch has been employed with good results.

Located immediately below the hook 18 at the point where the bifurcations 14, 15 meet, there is provided an opening 19 which allows the fishing line to enter the central opening 16 once it has been snagged by the hook 18. The opening 19 can be of any of various sizes, depending upon the diameter of the fishing line with which the device 10 is employed. Generally, an opening 19 of from about 0.5 mm to about 1.75 mm may be employed, and an opening of about 1 mm will handle most of the present fishing lines, particularly those of the type employed in fresh water fishing where most snagged fishing lures are apt to occur. The opening is preferably slightly less than the diameter of the fishing line, thus allowing the line to pass through the opening 19 under a small amount of increased tension, but with such an opening being effective to prevent the line from passing back out through the opening 19 once it is retained within the central opening 16. The straight smooth side walls provided by the bifurcations 14, 15 also assist in preventing the line from passing back out through the opening 19, as the line moves freely within the opening 16, and is not allowed to hang up or become snagged on the interior of the device 10.

The end member 12 is provided with a threaded lower end portion 21 for attachement to the pole 11 and to provide a strong bond between the pole 11 and the end member 12. The pole 11 may be constructed of any suitable material such as, for example, fiberglass, having a threaded receptacle 23 with inset portion 24 which receives the lower portion 25 of the throat 13 of the end member 12 to produce the desired strong bonding effect.

The pole member 11 is advantageously constructed in sections, so that a relatively short pole 11 is employed in shallow water conditions, and with additional sections being added as necessary for deep water operation. Thus a pole 11 having an overall length of from 12 to 16 feet, and made up of three or four 4-foot connectable sections, should provide sufficient length to reach most submerged fish hooks and lures. A pole 11 constructed of fiberglass having a 11/32 inch outside diameter, or a tapered fiberglass pole 11 with a 11/32 inch outside diameter tip, may be employed with good results.

Figure 3:
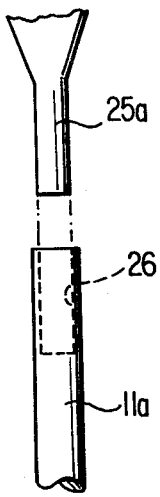
FIG. 3 shows an alternative connecting portion of the device of FIG. 1.

In FIG. 3 there is shown an alternative embodiment of end portion 25a to be inserted into an inner recess 26 in the pole 11a. In this embodiment, epoxy glue or other suitable sealing material is employed to retain the end 25a within the inner recess 26.

Figure 4:
FIGS. 4 through 6 are partial perspective views which show alternative embodiments of the opening through which fishing line passes into the main central opening of the present invention.
Figure 5:
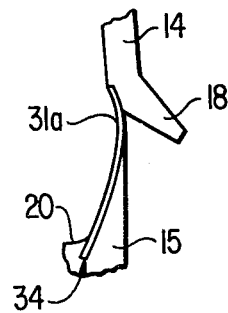
Figure 6:
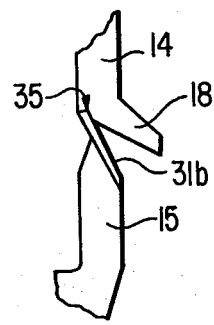

FIGS. 4 through 6 show various alternative embodiments for the opening 19 through which fishing line passes into the central opening 16. In the embodiment of FIG. 4, a small inwardly concave closure member 31 of spring steel or similar material is mounted in recesses 32, 33 in the respective bifurcations 14, 15. The lower end of the closure member 31 is secured by soldering, adhesive sealing material or similar means to the interior surface of bifurcation 15, while the upper end of member 31 is freely movable in the direction of the interior opening 16 so as to allow the fishing line to pass inwardly thereof upon application of sufficient pressure to overcome the spring bias of the member 31. The recessed mounting of the member 31 avoids snagging of the fishing line.

The embodiment of FIG. 5 is similar to that of FIG. 4 except that the lower portion of closure member 31a is mounted along and secured to the entire length of a narrowed bifurcation 15 and the lower end of the member 31a is mounted in a recess 34 in the interior surface 20 at the upper end of the throat 13. In this way also, the smooth interior contour is maintained to avoid snagging of the fishing line.

In FIG. 6 there is shown an embodiment in which the closure member 31b is secured to the exterior upper surface of member 15 which is slanted inwardly. The upper end of the member 31b is positioned in a recess 35 and moves inwardly under pressure from the fishing line to allow the line to pass into the interior opening 16. Thus in each of the embodiments of the invention, the smooth contoured interior surfaces are sought to be maintained, and with a sufficient opening 19 being provided to allow the fishing line to pass into the central opening 16, while effectively preventing the line from passing back out through the opening 19.

As previously described, the device 10 of the present invention provides a specialized fishing tackle item which is easily utilized for the disengagement and retrieval of snagged fishing hooks and fishing lures. In the operation of the device 10, the operative end member 12 is connected to a pole 11 which may vary in length, depending on the depth at which the snag has occurred. The operator, with pole 11 in hand, proceeds to snag the fishing line to which the snagged lure is connected by the use of the hook 18. Once the fishing line has been snagged, the operator exerts sufficient pressure on the line to force the line through opening 19 into the central opening 16 of the device 10. Extending the pole 11, the operator then pushes the device 10 down the fishing line until the device 10 makes contact with the snagged lure. The snagged lure may then be gently unsnagged by pushing the device 10 downwardly in a gentle but firm manner. In so doing, the streamlined configuration of the device 10, and the direct line of force from the operator through to the flat upper end 17 of the device 10, combine to facilitate the ease of handling and movement of the device 10 required to unsnag the lure. Once the hook or lure is unsnagged, the hook or lure may be retrieved by one or both actions of pulling up the device 10 and reeling in the fishing line.

It is thought tht the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely preferred embodiments thereof.

It is claimed:

1. A device for disengagement and retrieval of snagged fishing hooks and lures, comprising: an elongated, operative end member which is adapted for attachment at one end thereof to a pole which is coaxial with the longitudinal axis of said end member, said end member being bifurcated with a central opening between the two bifurcations, a first of said bifurcations extending upwardly, across the extreme outer end of said end member and downwardly in an inverted U-shaped configuration, said first bifurcation terminating in a hook portion which extends outwardly and downwardly, a second of said bifurcations extending upwardly to a point just short of engagement with the downwardly extending portion of said first bifurcation so as to define an opening therebetween for a fishing line to enter said central opening, the longitudinally extending inner sides of said bifurcations adjacent said central opening being generally straight and smooth, and with said first bifurcation defining means for applying a force in a direct line from an operator of the device through to the end of the device in order to disengage said fishing hooks and lures, said means including a flat surface at the extreme outer end of said first bifurcation in a direct line with the longitudinal axis of said operative end member.

2. The device of claim 1, wherein said hook portion extends downwardly at an angle of from about 22 to about 68 degrees relative to the longitudinal axis of said device.

3. The device of claim 1, wherein said hook portion extends outwardly from the main portion of said first bifurcation a distance of from about ⅛ inch to about 7/16 inch.

4. The device of claim 1, wherein said opening for fishing line is from about 0.5 mm to about 1.75 mm in length.

5. The device of claim 1, wherein said opening for fishing line is provided with a spring biased closure member.